United States Patent [19]
Field et al.

[11] 3,944,649

[45] Mar. 16, 1976

[54] MULTISTAGE PROCESS FOR REMOVING SULFUR DIOXIDE FROM STACK GASES

[75] Inventors: Edwin L. Field; Charles R. Lamantia, both of Lexington; Richard R. Lunt, Acton; James E. Oberholtzer, Lexington; James R. Valentine, Reading, all of Mass.

[73] Assignee: Combustion Equipment Associates, Inc., New York, N.Y.

[22] Filed: Dec. 13, 1973

[21] Appl. No.: 424,212

[52] U.S. Cl.............. 423/242; 423/166; 423/512 R
[51] Int. Cl.²......................................... C01B 17/00
[58] Field of Search ........... 423/242, 166, 512, 243, 423/244

[56] References Cited
UNITED STATES PATENTS

| | | | |
|---|---|---|---|
| 1,271,899 | 7/1918 | Howard | 423/242 |
| 3,775,532 | 11/1973 | Shah | 423/242 |
| 3,873,532 | 3/1975 | Dahlstrom et al. | 423/242 |

*Primary Examiner*—Oscar R. Vertiz
*Assistant Examiner*—Gregory A. Heller
*Attorney, Agent, or Firm*—Bessie A. Lepper

[57] ABSTRACT

Method and apparatus for removing sulfur dioxide from stack gases. The stack gases are scrubbed with an aqueous wash liquid containing one or more alkali metal compounds which react to form the bisulfite, sulfite and sulfate salts of the alkali metal. The spent absorbent liquid effluent is then treated with calcium compounds in at least two separate reaction stages, the conditions of ion concentration and pH of the first stage being maintained to favor the precipitation of calcium sulfate in the presence of $SO_3^=$ ions. In the succeeding reaction stages the precipitation of the desired amount of $SO_3^=$ ions is carried out to form calcium sulfite. The resulting compounds of calcium with sulfite and sulfate (which may in part be in the form of mixed crystals) are removed and the regenerated liquid is recycled.

9 Claims, 1 Drawing Figure

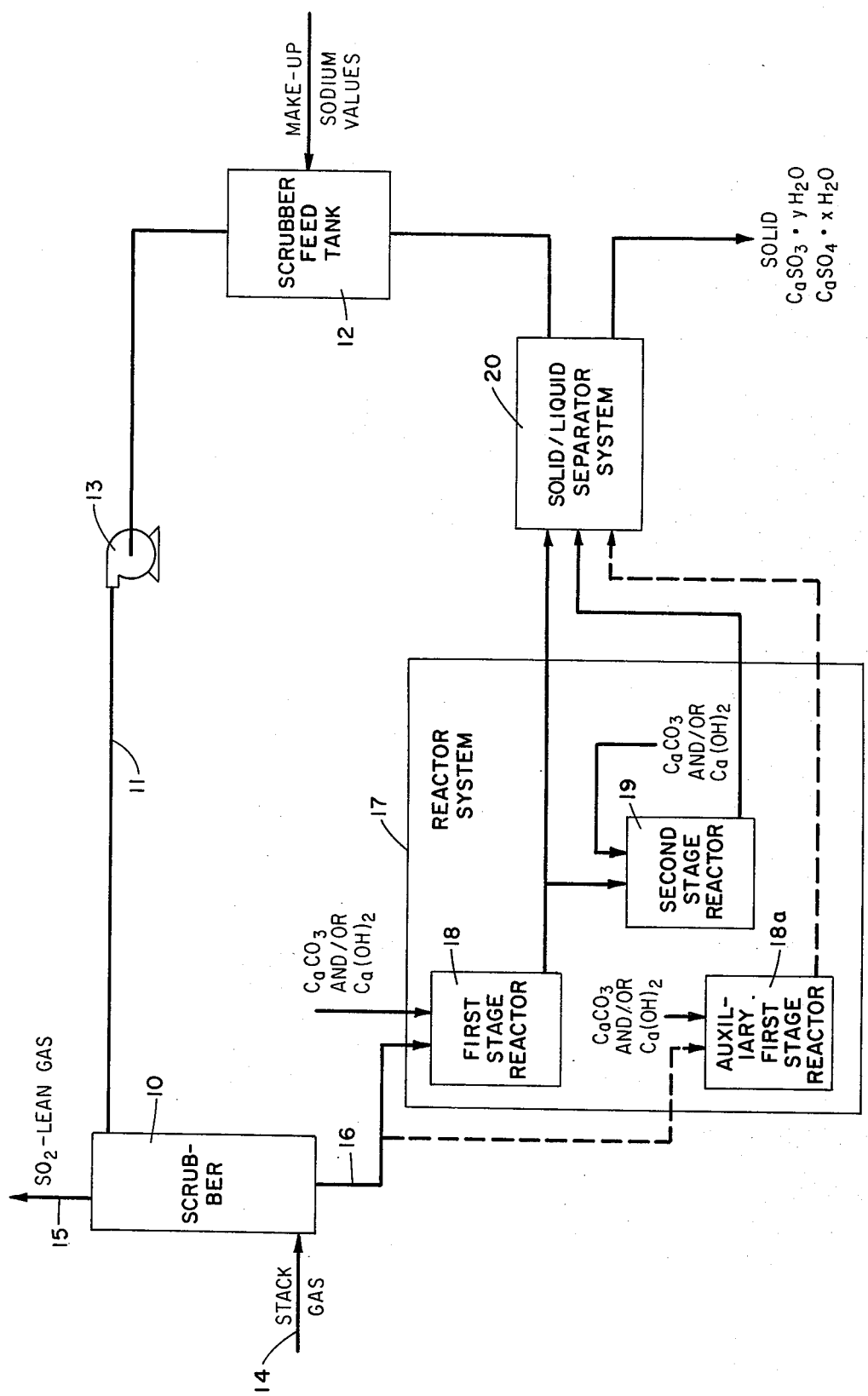

MULTISTAGE PROCESS FOR REMOVING SULFUR DIOXIDE FROM STACK GASES

This invention relates to a process for the removal of sulfur dioxide from stack gases and more particularly to such a process wherein stack gases are contacted with a wash liquid to form an alkali metal bisulfite, sulfite and sulfate and the alkali metal ion values are subsequently recovered for recycling.

With the more recent realization for the need for clean air, it has become necessary to maintain the sulfur dioxide content in stack gases below prescribed minimum levels. The two obvious alternative approaches to attain this goal are the use of essentially sulfur-free fuel and the processing of the stack gases to remove sulfur dioxide resulting from the use of sulfur-containing fuels. Since, however, sulfur-free fuels are generally more expensive than sulfur-containing fuels and are, moreover, not available in sufficient quantities for many large-scale uses (e.g., electric utility and industrial scale boilers) it is necessary to provide efficient and economical means for removal of sulfur dioxide from stack gases.

Among some of the approaches being considered suitable for removal of sulfur dioxide in stack gases from utility- and industrial-scale boilers are (1) once-through scrubbing with a solution of sodium carbonate or sodium hydroxide; (2) lime or limestone slurry scrubbing; and (3) sodium scrubbing with lime regeneration. (See "Chemical Engineering Progress Technical Manual, Sulfur and $SO_2$ Developments" A.I.Ch. E. pp 142–150 (1971).)

Once-through sodium scrubbing represents, at least for some situations, the simplest and most reliable process; but its application is limited to locations where the dissolved solids load, when combined with the remainder of the plant liquid effluent, can be treated to be acceptable as a liquid waste stream. Direct lime or limestone slurry scrubbing produces a low-solubility solid waste and is applicable at a wider range of locations than once-through sodium scrubbing. Although the cost of scrubbing chemicals is relatively low, capital cost requirements are high because a slurry of solid calcium salts must be recirculated at high rates, and the attainment of reliability is still in doubt because of the possibility of the uncontrolled deposition of a solid scale in various parts of the system.

Sulfur dioxide removal based upon sodium scrubbing with lime and/or limestone regeneration incorporates the better features of the first two processes and offers additional advantages over both of them. Thus, it may be shown that sodium scrubbing with lime regeneration can use less expensive raw chemicals, produce a solid waste, can be designed for higher removal efficiency, can minimize or even eliminate scaling problems, and can lower investment costs and operating and maintenance problems.

In the process based upon sodium scrubbing with lime regeneration, the stack gases are scrubbed with an aqueous solution of sodium hydroxide and sodium sulfite (and perhaps some make-up sodium carbonate) to produce additional sodium sulfite and sodium bisulfite. Because the stack gases normally contain at least a few percent oxygen, a portion of the sodium sulfite is oxidized to sodium sulfate. This in turn means that the spent absorbent liquid effluent from the scrubber contains sodium bisulfite, sodium sulfite and sodium sulfate. In order to recover the sodium values from these compounds it is necessary to precipitate compounds of calcium with sulfite and sulfate. But in the presence of reasonably high and economically feasible concentrations of $SO_3^=$ ions, calcium sulfate is not formed which means that sodium values are lost and the sodium sulfate concentration in the recirculating liquid continues to increase. One obvious solution to this problem of sodium sulfate build-up is to operate with scrubbing liquids and effluents having $SO_3^=$ concentrations which are sufficiently low to permit precipitation of the $SO_4^=$ as calcium sulfate. This solution, however, gives rise to high $Ca^{++}$ ion concentrations in the regenerated liquor which in turn requires further processing to soften the liquor and to remove $Ca^{++}$ ions in order to prevent scaling in the scrubber. Moreover, operating the process with low $SO_3^=$ concentrations requires excessively large equipment. In order to realize all of the advantages associated with the process of sulfur dioxide removal based upon sodium scrubbing with lime regeneration, it would be desirable to be able to operate in a concentrated sodium sulfite mode using a reasonably-sized plant and a minimum quantity of recycling liquid with low $Ca^{++}$ ion concentration by providing for the efficient removal of the $SO_4^=$ present in the scrubber effluent.

It is therefore a primary object of this invention to provide an improved process for the removal of sulfur dioxide from stack gases, the process incorporating sodium scrubbing with lime and/or limestone regeneration. It is another object to provide a process of the character described which achieves the effective removal of $SO_4^=$ ions from the spent liquid effluent as calcium sulfate, or calcium sulfate/calcium sulfite mixed crystals, and the return of the sodium values derived from sodium sulfate into the recycled liquid. It is yet another object of this invention to provide such a process which is relatively simple and which can be effectively and efficiently carried out with the minimum of complexity, equipment size and stream flow rates. Still another object of this invention is to provide a process for removing sulfur dioxide from stack gases which permits operation with high $HSO_3^-$ ion concentrations, which makes it possible to provide at least a portion of the $Ca^{++}$ ions from limestone rather than from the more expensive lime; and which does not require any adjustment of the temperature of the scrubber effluent prior to the recovery of the sodium values. It is an additional object to provide a process for removing sulfur dioxide from stack gases which results in the formation of precipitated solids having good settling and filtration characteristics thereby eliminating any significant carryover of suspended calcium salts back into the scrubber, and which also provides a high sulfite ion concentration in the reactor system which in turn gives rise to low calcium ion concentrations in the liquor.

Other objects of the invention will in part be obvious and will in part be apparent hereinafter.

In the process of this invention sulfur dioxide in stack gases is removed by reaction with one or more water-soluble sodium compounds to form sodium bisulfite, sodium sulfite and sodium sulfate. The scrubber effluent liquid containing the reaction products is then reacted with calcium compounds in multiple stages, the reaction conditions of the first of these multiple stages being maintained to favor the precipitation of calcium sulfate in the presence of a relatively high concentration of $SO_3^=$. Some calcium sulfite is formed in the first stage and the remaining required amount is precipitated out in the succeeding stage or stages. Thus a steady state condition is established in the system whereby the $SO_4^=$ ions are removed as formed even in the presence of a relatively large $SO_3^=$ ion concentration.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the single accompanying drawing which is a flow diagram of the method of this invention.

In the following description, it will be assumed for convenience in describing the invention that sodium compounds, e.g., NaOH and $Na_2SO_3$ are used in the scrubbing liquid. However, it is to be understood that the hydroxides, carbonates and sulfites of the other alkali metals (i.e., lithium, potassium, rubidium and cesium as well as ammonium) may be used in the process of this invention.

The process of this invention may be further described in detail with reference to the drawing which is a somewhat simplified flow diagram. The stack gases from which sulfur dioxide is to be removed are introduced into a scrubber 10 which is a mass transfer apparatus suitable for effecting efficient gas-liquid contact to react the required amount of the $SO_2$ with the sodium hydroxide and sodium sulfite supplied as an aqueous solution through line 11 from a wash liquid source 12 by a pump 13. The scrubber 10 may be any suitable commercially available apparatus such as a countercurrent or cocurrent scrubbing device or combination of such devices. In the drawing, a countercurrent scrubber is shown in which the $SO_2$-containing stack gas is introduced near the bottom through line 14 and the $SO_2$-lean gas is discharged near the top through line 15. It will be appreciated that it will normally not be feasible to remove all of the $SO_2$ from the stack gases and that the actual amount of $SO_2$ to be removed will be preset for any one given set of circumstances and that the operational parameters of the $SO_2$-removal process will then be determined to meet the requirements of the system designed for the circumstances.

Within scrubber 10 the absorption of $SO_2$ gives rise to the formation of sodium bisulfite, sodium sulfite and sodium sulfate according to the following overall reactions $$2NaOH + SO_2 \rightarrow Na_2SO_3 + H_2O \tag{1}$$

$$Na_2SO_3 + SO_2 + H_2O \rightarrow 2NaHSO_3 \tag{2}$$

$$2Na_2SO_3 + O_2 \rightarrow 2Na_2SO_4 \tag{3}$$

This solution, which is the spent absorbent liquid effluent, is withdrawn through line 16 into a reactor system 17 which is seen to consist of multiple stages, e.g., 18 and 19. Neutralization of this solution by the addition of lime ($Ca(OH)_2$) and/or limestone ($CaCO_3$) readily forms sodium sulfite and/or sodium hydroxide $$Ca(OH)_2 + 2NaHSO_3 \rightarrow CaSO_3 + Na_2SO_3 + 2H_2O \tag{4}$$

$$CaCO_3 + 2NaHSO_3 \rightarrow CaSO_3 + Na_2SO_3 + CO_2 + H_2O \tag{5}$$

$$Ca(OH)_2 + Na_2SO_3 \rightarrow CaSO_3 + 2NaOH \tag{6}$$

However, the reaction $$Ca^{++} + SO_4^= \rightarrow CaSO_4 \tag{7}$$

(whether producing $CaSO_4$ as such or a mixture of $CaSO_4$ and $CaSO_3$ crystals) required to precipitate $CaSO_4$ in some form and free the sodium values in $Na_2SO_4$ for active participation in the absorption process does not take place in the presence of relatively high sulfite concentrations. We have found, however, that a sufficient quantity of the sulfate ions present can be removed by carrying out the causticization, or neutralization, in two or more stages provided the conditions in the first stage 18 are maintained to favor reaction (7), that is, favor the formation of $CaSO_4$. In the following description and in the claims defining our invention, it is to be understood that precipitation of $CaSO_4$ includes the precipitation of mixed salts containing $CaSO_4$. These conditions in the first stage to produce $CaSO_4$ are generally concerned with ion concentration, pH and residence time in reactor 18. The temperature of the reactor has little, if any, influence on the reactions and hence is not one of the conditions. This in turn means that no adjustment in the temperature of the spent absorbent effluent delivered to reactor 18 is necessary. In general, the temperature of the scrubber liquid effluent will range between about 110° and 130°F.

The conditions of ion concentrations which should prevail in the feed to the first stage may be expressed in concentration of total oxidizable sulfur ($HSO_3^-$ + $SO_3^=$), $SO_4^=$ ion concentration and the ratio of $HSO_3^-/SO_3^=$. Oxidizable sulfur concentration may be as high as about one molar, and it is desirable to work with concentrations approaching this level to maintain equipment size and cost as low as possible. However, total oxidizable sulfur concentrations may be as low as about 0.1 molar. Sulfate ion concentrations in the first stage may range between about 0.1 and 2.8 molar and will depend to a great extent upon the quality of the stack gases, i.e., the extent to which they are capable of oxidizing some of the $Na_2SO_3$. The ratio of $HSO_3^-/SO_3^=$ may range from ∞ to 1, that is, this ratio should be at least one.

The quantity of lime and/or limestone added to the first stage reactor 18 is preferably that which is less than sufficient to attain full neutralization. Thus the pH maintained in the first stage reactor should be on the acid side to obtain optimum results, and more specifically, it should range from about about 4.5 and 6.8. However, some of the benefits of the two-stage reactor system of this invention (attainment of good settling and filtering characteristics and some sulfate regeneration) may be realized by operating the first stage well beyond the neutral condition to higher pH's provided the residence time in reactor 18 is properly adjusted. By carrying out this first stage of neutralization so that the spent absorbent liquid under treatment remains acidic, $CaSO_4 \cdot xH_2O$ is precipitated and can be subsequently removed by settling and/or filtration techniques. Since the $CaSO_4 \cdot xH_2O$ crystals thus formed are subject to redissolving as equilibrium with calcium sulfite and sulfate is approached, the residence time of the precipitated solids in the first stage reactor should be short enough to minimize this redissolution. This means that residence time of the solids in the first stage reactor should be no greater than about 30 minutes and preferably should be from about 3 to 5 minutes. When limestone rather than lime is used, the longer residence time may be more desirable.

By maintaining the above-specified conditions in the first stage reactor 18, $CaSO_3 \cdot yH_2O$ crystals are formed along with $CaSO_4 \cdot xH_2O$ crystals, and these crystals have good settling and filtration characteristics which make it possible to easily remove them from the regeneration effluent slurry. As will be seen in the drawing, a portion of the slurry from the first stage reactor 18 is taken directly to a solid/liquid separator 20 while the remainder of the slurry is introduced into the second stage reactor 19 for complete neutralization with additionally supplied lime and/or limestone. The crystals formed in the first stage reactor and carried over into the second stage reactor serve as seed crystals. In any case, the sodium bisulfite and a major portion of the sodium sulfite is finally reacted with the lime and/or limestone in the second stage reactor 19 to form the desired $Na_2SO_3$ and $NaOH$ according to reactions (4)–(6). A sufficient quantity of lime and/or limestone is added to the second stage reactor to continue neutralizing it or to make it basic, i.e., to give it a pH up to about 12 when using lime. Under these conditions the remaining required amount of the $CaSO_3$ will precipitate out; and the major portion of the solids formed will be $CaSO_3$. Although only one multistage reactor system is shown in the drawing, it is within the scope of this invention to have more than one reactor system in parallel so that there can be several trains of multistage reactors. The actual number of reactors will depend upon the required sulfur removal capacity. Under some conditions, the economics or the cost of lime and limestone may justify more than two reactor stages in series in order to keep down the size of the reactor system and to optimize the utilization of the chemicals. The determination of the advisability of using more than one second stage reactor, as well as the use of parallel reactor systems, is well within the skill of the art, and will depend upon such factors as flow rates handled, equipment used, space available and the like.

The $CaSO_3$ formed in the second stage reactor, as well as the mixed $CaSO_4/CaSO_3$ product formed in the first stage reactor, are separated out in the separator system 20 from which the solid phase containing $CaSO_3 \cdot yH_2O$ and $CaSO_4 \cdot xH_2O$ is discharged for discard or further processing and the liquid phase containing $Na_2SO_3$ in solution is directed to scrubber feed tank 12 into which make-up sodium values, normally as sodium hydroxide or carbonate, are added.

As shown in the drawing, an auxiliary first stage reactor 18a may be used in addition to first stage reactor 18 to handle a portion of the spent absorbent effluent. The reaction conditions in this auxiliary first stage reactor are the same as previously described for reactor 18. All of the slurry formed in auxiliary reactor 18a, comprising liquid and crystals of $CaSO_4$ and $CaSO_3$, is transferred directly to the solid/liquid separator system 20. The use of the auxiliary first stage reactor makes it possible to handle a slip stream for sulfate regeneration which can be processed separately for solid-liquid separators and thus to minimize the amount of $CaSO_4$ which may be redissolved.

The reactors may be any suitable commercially available apparatus designed to handle this type of reaction system. Such reactors include, but are not limited to, baffled, stirred tank reactors. The solid/liquid separator may likewise be any suitable commercially available equipment suitable for separating solids from a liquid slurry. Examples of such separators are thickeners, clarifiers, filters, centrifuges or combinations of these. Separate separators may be used for the first and second stage reactor effluents to minimize the amount of $CaSO_4$ which may redissolve.

It will be seen from the above detailed description that the process of this invention makes it possible to provide solid regeneration products comprising both $CaSO_4 \cdot xH_2O$ and $CaSO_3 \cdot yH_2O$ having settling and filtration characteristics such that the solids can be easily removed from the effluent slurry to provide a regenerated wash liquid which has an acceptably low and constant concentration of $Na_2SO_4$. Thus the ion concentrations at the various reaction stages of the process are maintained within optimum ranges and maximum sodium values are recovered. Moreover, the process of this invention makes it possible to work with relatively high $SO_3^=$ and $HSO_3^-$ ion concentrations in the wash liquid which in turn makes it possible to keep down the size of the equipment used. By carrying out only a partial neutralization in the first reactor stage, the cheaper limestone may be used in place of or as a substitute for a part of the lime used, thus contributing to the economics of the process.

Because the process generates precipitated solids which have good settling and filtration characteristics, thus eliminating carryover of any significant amount of calcium salts into the scrubber, and because the high sulfite concentration in the reactor system provides for a very low $Ca^{++}$ ion concentration in the liquor, the $Ca^{++}$ ion concentration is very low in the regenerated scrubber liquor which in turn means that no additional chemicals or equipment must be supplied to soften the regenerated liquid to prevent scaling.

Finally, since the process is not influenced by fluctuations in temperature within the ranges normally encountered in scrubbing stack gases, there is no need to provide means for effecting a temperature adjustment in the spent absorbent effluent discharged from the scrubber.

It will thus be seen that the objects set forth above, among those made apparent from the preceding description, are efficiently attained and, since certain changes may be made in carrying out the above process and in the constructions set forth without departing from the scope of the invention, it is intended that all matter contained in the above description or shown in the accompanying drawing shall be interpreted as illustrative and not in a limiting sense.

We claim:

1. In a process for removing sulfur dioxide from stack gases which includes the steps of contacting stack gases with an aqueous wash liquid comprising a solution of one or more alkali metal compounds thereby to form a spent absorbent liquid containing the bisulfite, sulfite and sulfate salts of said alkali metal and then subsequently recovering at least a portion of the alkali metal ion values by reacting said bisulfite, sulfite and sulfate salts in said spent absorbent liquid with one or more calcium compounds to precipitate calcium sulfite and calcium sulfate, the improvement comprising (1) carrying out the step of reacting said bisulfite, sulfite and sulfate salts with said calcium compounds in multiple stages, said spent absorbent liquid introduced into the first stage having a total oxidizable sulfur concentration of at least about 0.1 molar, a ratio of bisulfite to sulfite ions of at lest one and a sulfate ion concentration of between about 0.1 and 2.8 molar whereby the reaction conditions of said first of said multiple stages are maintained to effect the precipitation of a solids mixture of calcium sulfate and calcium sulfite in said first stage, said solids mixture having greatly enhanced settling and filtration characteristics, (2) limiting the mean residence time of said solids mixture in said first stage to not more than 30 minutes, and (3) transferring at least a portion of said solids mixture of calcium sulfate and calcium sulfite formed in said first stage to one or more succeeding stages to serve as seed crystals for the further precipitation of calcium salts.

2. A process in accordance with claim 1 wherein said spent absorbent liquor has a pH from between about 4.5 and 6.8.

3. A process in accordance with claim 1 including the step of separating out that portion of said solids mixture formed in said first of said multiple stages not transferred to said one or more succeeding stages along with solids formed in said one or more suceeding stages from said spent absorbent liquid to form a regenerated wash liquid suitable, with the addition of any required make-up alkali metal values, for recycling.

4. A process in accordance with claim 3 wherein said first of said multiple stages includes an auxiliary first stage, the reaction conditions and solids mixture residence time in which are essentially the same as in said first of said multiple stages.

5. A process in accordance with claim 4 including the step of separating out the solids mixture formed in said auxiliary first stage from said spent absorbent liquid.

6. A process in accordance with claim 5 wherein said step of separating out said solids mixture formed in said auxiliary first stage from said spent absorbent liquid is performed separately from said step of separating out said solids formed in said first and said one or more succeeding stages from said spent absorbent liquid.

7. A process in accordance with claim 5 wherein said solids mixture and said spent absorbent liquid from said auxiliary first stage are added to said solids mixture and said spent absorbent liquid from said first and said one or more succeeding stages prior to said separating step.

8. A process in accordance with claim 1 wherein said alkali metal is sodium and said alkali metal compound is sodium hydroxide.

9. A process in accordance with claim 1 wherein said calcium compound is calcium hydroxide, calcium carbonate or a mixture thereof.

* * * * *